(12) United States Patent
Putrāms

(10) Patent No.: US 12,612,899 B2
(45) Date of Patent: Apr. 28, 2026

(54) DEVICE FOR WIND TURBINE BLADE AND TOWER MAINTENANCE AND A SYSTEM FOR RAISING AND LOWERING THE DEVICE

(71) Applicant: AERONES AMERICA LLC, San Jose, CA (US)

(72) Inventor: Jānis Putrāms, Rīga (LV)

(73) Assignee: Aerones America LLC, San Jose, CA (US)

( * ) Notice: Subject to any disclaimer, the term of this patent is extended or adjusted under 35 U.S.C. 154(b) by 641 days.

(21) Appl. No.: 17/629,974

(22) PCT Filed: Jul. 26, 2019

(86) PCT No.: PCT/IB2019/056393

§ 371 (c)(1),
(2) Date: Jan. 25, 2022

(87) PCT Pub. No.: WO2021/019274

PCT Pub. Date: Feb. 4, 2021

(65) Prior Publication Data

US 2022/0252053 A1      Aug. 11, 2022

(51) Int. Cl.
*F03D 80/55* (2016.01)
*F03D 1/06* (2006.01)
*F03D 80/50* (2016.01)

(52) U.S. Cl.
CPC .......... *F03D 80/55* (2016.05); *F03D 1/0675* (2013.01); *F03D 80/50* (2016.05); *F05B 2230/80* (2013.01)

(58) Field of Classification Search
CPC ........ F03D 80/55; F03D 80/50; F03D 1/0675; F05B 2230/80
See application file for complete search history.

(56) References Cited

U.S. PATENT DOCUMENTS

| 8,544,484 B2 * | 10/2013 | Jensen | .................... F03D 80/50 |
| | | | 134/198 |
| 9,624,901 B2 * | 4/2017 | Günther | ................. F03D 80/50 |

(Continued)

FOREIGN PATENT DOCUMENTS

| EP | 1517033 A1 | 3/2005 | |
| EP | 2752621 A2 * | 7/2014 | ............. B08B 1/002 |

(Continued)

OTHER PUBLICATIONS

International Search Report for PCT/IB2019/056393, Prepared by the European Patent Office, Mailing date Apr. 24, 2020, 2 pages.

*Primary Examiner* — Nathaniel E Wiehe
*Assistant Examiner* — Art Golik
(74) *Attorney, Agent, or Firm* — Nicola A. Pisano; Cozen O'Connor

(57) ABSTRACT

A wind turbine blade and tower maintenance devices, used for servicing, including cleaning, inspection, deicing and painting of wind turbine blades and tower. The device has: a central rod, three balancing rods, a central hub, at least one tool arm adapted to releasably fix one or more tools aimed for surface maintenance; and a tool arm motor adapted to adjust the angle of the tool arm in respect of the central rod, wherein: the central rod and three balancing rods are connected to the central hub; the tool arm is rotatably fixed to the central rod and/or to the central hub via tool arm motor drive; the three balancing rods, as well as central rod or the central hub are adapted to be connected to carrying and balancing ropes or cables. A system for lowering and raising of the arrangement is also disclosed.

20 Claims, 3 Drawing Sheets

(56)     References Cited

U.S. PATENT DOCUMENTS

| | | | | |
|---|---|---|---|---|
| 10,161,389 | B2 * | 12/2018 | Teichert | .................. F03D 80/50 |
| 11,149,718 | B2 * | 10/2021 | Georgeson | ........... G01N 29/348 |
| 2009/0020361 | A1 * | 1/2009 | Teichert | .................. F03D 80/50 |
| | | | | 182/36 |
| 2009/0173573 | A1 * | 7/2009 | Teichert | .................... E04G 3/30 |
| | | | | 182/19 |
| 2010/0132137 | A1 * | 6/2010 | Eggleston | ............... B08B 3/022 |
| | | | | 15/21.1 |
| 2011/0140060 | A1 | 6/2011 | Olson et al. | |

FOREIGN PATENT DOCUMENTS

| | | | | | |
|---|---|---|---|---|---|
| KR | 101225691 | B1 | * | 3/2013 | |
| KR | 20130025519 | A | * | 3/2013 | |
| KR | 101368675 | B1 | * | 3/2014 | |
| KR | 20140099339 | A | * | 8/2014 | |
| KR | 101592904 | B1 | | 2/2016 | |
| WO | 11107087 | A2 | | 9/2011 | |
| WO | WO-2011107087 | A2 | * | 9/2011 | ............. B08B 1/008 |
| WO | WO-2018155704 | A1 | * | 8/2018 | ............. B08B 1/00 |
| WO | 19068299 | A1 | | 4/2019 | |
| WO | WO-2019068299 | A1 | * | 4/2019 | ............. B05B 1/30 |
| WO | WO-2019155234 | A1 | * | 8/2019 | ............. B23P 6/002 |

* cited by examiner

DEVICE FOR WIND TURBINE BLADE AND TOWER MAINTENANCE AND A SYSTEM FOR RAISING AND LOWERING THE DEVICE

CROSS-REFERENCE TO RELATED APPLICATION

This application is the U.S. national phase of PCT Application No. PCT/IB2019/056393 filed on Jul. 26, 2019, the disclosure of which is incorporated in its entirety by reference herein.

TECHNICAL FIELD

The invention relates to wind turbine blade and tower maintenance devices, used for servicing, including cleaning, inspection, deicing and painting of wind turbine blades and tower.

BACKGROUND ART

In the course of use wind turbine blades require constant maintenance. Bird strikes, lightning strikes, leading edge and surface erosion cause damage to wind turbine blades. Damaged, faulty, dirty, or covered by ice wind turbine blades can reduce overall productivity of the wind turbine.

Traditionally, blade inspection and maintenance are made by industrial climbers, who use rope and cradle access to get to the blade. More comfortable workspace can ensure use of a platform travelling along the wind turbine. However, safer, less expensive and less time-consuming solutions for wind turbine blade maintenance use robots or arrangements, which do not require presence of workers at heights.

There is known a work platform for use on a blade of a wind turbine (U.S. Pat. No. 9,624,901 B2). The work platform is provided with space for a technician and is preferably adapted for positioning along a leading or trailing edge of a wing blade, and is further comprising at least two projecting arms for contact against the surface of the blade.

There is known blade maintenance device for wind turbine (EP 2752621 B1) comprising a body adapted to travel along a leading edge of a wind turbine blade, support arms with rollers, which extend from the body to both sides of the blade; and a maintenance unit installed at the body; the maintenance unit comprising cleaning robot arms installed at both sides of the body and a cleaning brush installed at a distal end of each of the arms.

There is known a wind turbine rotor blade cleaner (WO 2011107087), comprising a U-shaped carrier with two legs, each of which is provided with rotating brush. The carrier is adapted to be placed on the front edge of a rotor blade, wherein free ends of the legs point toward the tip of the profile of the rotor blade and are arranged on the two sides of the rotor blade lying opposite each other.

There is known an apparatus for cleaning of oblong objects (EP 1517033 B1), comprising two spaced apart substantially cylindrical brush devices, being rotatable about their longitudinal axis. Each brush device is attached at least in one end to an intermediate frame, wherein the attachment comprises a hinge means allowing the brush device to pivot in a first plane, and pivot control means comprising an actuator in such a manner that the relative angle between the longitudinal axis of the two brush devices may be adjusted, and that the distance between the two brush devices may be adjusted by sliding movement initiated by a second actuator means attached to the intermediate frame, and that said intermediate frame is attached to a main frame, said main frame comprising means for being attached to a lifting means.

There is known a wind turbine blade treatment apparatus (U.S. Pat. No. 8,544,484 B2), comprising a support having a frame with an edge follower configured to be positioned near an edge of a wind turbine blade. The support further comprising a side member connected to the frame and configured to extend at least partially along a width of the wind turbine blade and to be positioned near the wind turbine blade. The wind turbine blade treatment apparatus further comprises a sprayer connected to the support, configured to spray fluid onto the wind turbine blade.

Although the prior art solutions partially solve the problem of efficient surface treating, their efficiency is still insufficient.

SUMMARY OF INVENTION

The invention provides an arrangement for wind turbine blade and tower maintenance as well as system for lowering and raising the arrangement. The arrangement comprising: a central rod, three balancing rods, a central hub, at least one tool arm adapted to releasably fix one or more tools aimed for surface maintenance; and a tool arm motor adapted to adjust the angle of the tool arm in respect of the central rod. The central rod and three balancing rods are connected to the central hub. The tool arm is rotatably fixed to the central rod and/or to the central hub via tool arm motor drive. The three balancing rods, as well as central rod or the central hub are adapted to be connected to carrying and balancing ropes or cables. According to the preferred embodiment the arrangement further comprises a rail with a slider and a motor connected to a lead screw, wherein the rail is fixed to the upper end of the central rod, with the slider located on the rail and connected to the motor drive via the lead screw, so that to allow controllable sliding motion of the slider along the rail. The slider, preferably, further comprises a guide designed to allow a carrying rope passing through it with minimal friction.

According to the preferable embodiment the hinges are fixed to the central hub and the balancing rods, so to allow at least limited rotation of the balancing rods in the vertical plane. According to yet another embodiment the arrangement further comprises arms, optionally having rotatable wheels; where each of the arms is further provided with a linear actuator fixed to the arm and the central rod; thereby the arms are adapted to position the arrangement for wind turbine blade and maintenance in respect of the wind turbine blade or tower. The optional wheels are designed to be rested upon the surface of the wind turbine blade and allow decreasing friction when moving the arrangement along the surface to be treated. According to yet another embodiment the arrangement further comprises a central rod motor, which is connected to the central rod via the motor drive, allowing controllable rotation of the central rod around its longitudinal axis.

DETAILED DESCRIPTION OF INVENTION

Figure 1:
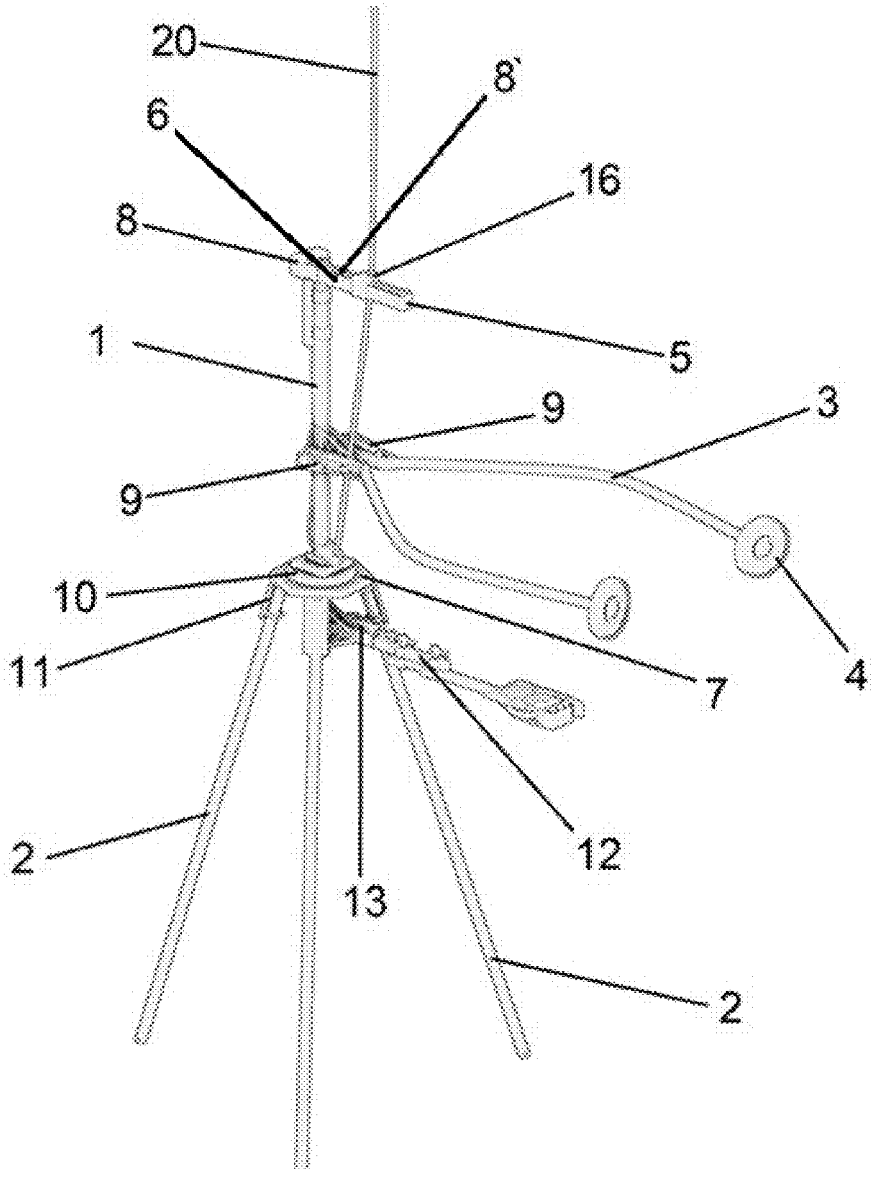
FIG. 1 shows a perspective view of the arrangement.

The proposed arrangement for wind turbine blade and tower maintenance, comprises a central rod 1, three balancing rods 2, a central hub 7, at least one tool arm 12 adapted to releasably fix one or more tools aimed for surface maintenance; and a tool arm motor 13 (e.g. linear servo motor or a rotating motor) adapted to adjust the angle of the tool arm 12 in respect of the central rod 1, wherein the central rod 1 and three balancing rods 2 are connected to the central hub 7; the tool arm 12 is rotatably fixed to the central rod 1 and/or to the central hub 7 via tool arm motor 13 drive; the three balancing rods 2, as well as central rod 1 or the central hub 7 are adapted to be connected to carrying and balancing ropes or cables. The arrangement may contain further optional elements.

Figure 2:
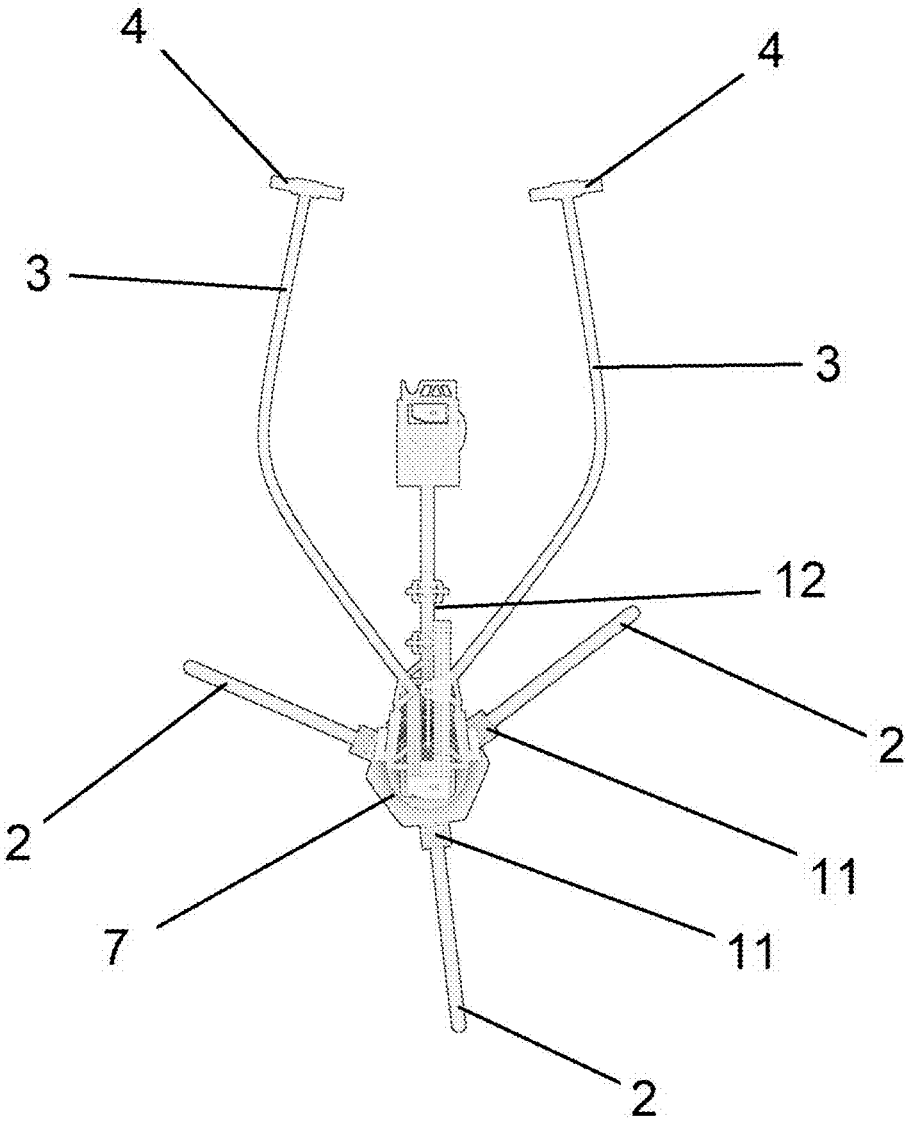
FIG. 2—top view of the arrangement.

According to the preferred embodiment the arrangement (FIG. 1-2), comprising: a central rod 1; three balancing rods 2; arms 3, having wheels 4; a rail 5; a slider 6 adapted to slide along the rail 5 and having a guide 16 designed to allow a rope passing through it with minimal friction; a central hub 7; a slider motor 8 with a lead screw 8' allowing to controllably move the slider 6 along the rail 5 for rope position adjustment along the rail 5; two linear actuators 9 adapted to position arms 3; a central rod motor 10 adapted for rotation of the central rod 1 around its longitudinal axis; hinges 11 adapted to allow the balancing rods 2 to rotate in the vertical plane; at least one tool arm 12 adapted to releasably fix one or more tools aimed for surface maintenance; a tool arm motor 13 adapted to adjust the angle of the tool arm 12 in respect of the central rod 1.

The arms 3 are optional for some maintenance works. For leading edge repair, they are needed to stop wind turbine blade swinging relative to the arrangement.

According to another embodiment, lower end of the central rod 1 is rotatably fixed to the central hub 7 via the central rod motor 10 drive, allowing controllable rotation of the central rod 1 around its longitudinal axis. The rail 5 is fixed to the upper end of the central rod 1. The slider 6 is located on the rail 5 and is connected to the slider motor 8 drive via the lead screw 8, so that to allow controllable sliding motion of the slider 6 along the rail 5.

The tool arm 12 is designed to releasably fix a tool intended for processing of a surface. This tool may be inspection or testing head, cleaning head with rotatable brushes and high-pressure nozzle, painting head, crack stitching head and other. A standardized connection is preferably made between the arms and every tool.

According to the preferred embodiment the device further comprises an electronic control unit.

It is obvious for the skilled person that said motors and linear actuators may be replaced by manual operation designs.

A carrying rope or cable 20 is connected to the central hub 7 or central rod 1 and, preferably, is put through the slider's 6 guide, which is designed to allow a carrying rope passing through it with minimal friction. Each balancing rope or cable 21 is connected to the respective balancing rod 2. The balancing rods 2 connected to the balancing ropes 21 ensure that the central rod 1 does not rotate when lateral force is applied to the arrangement.

Figure 3:
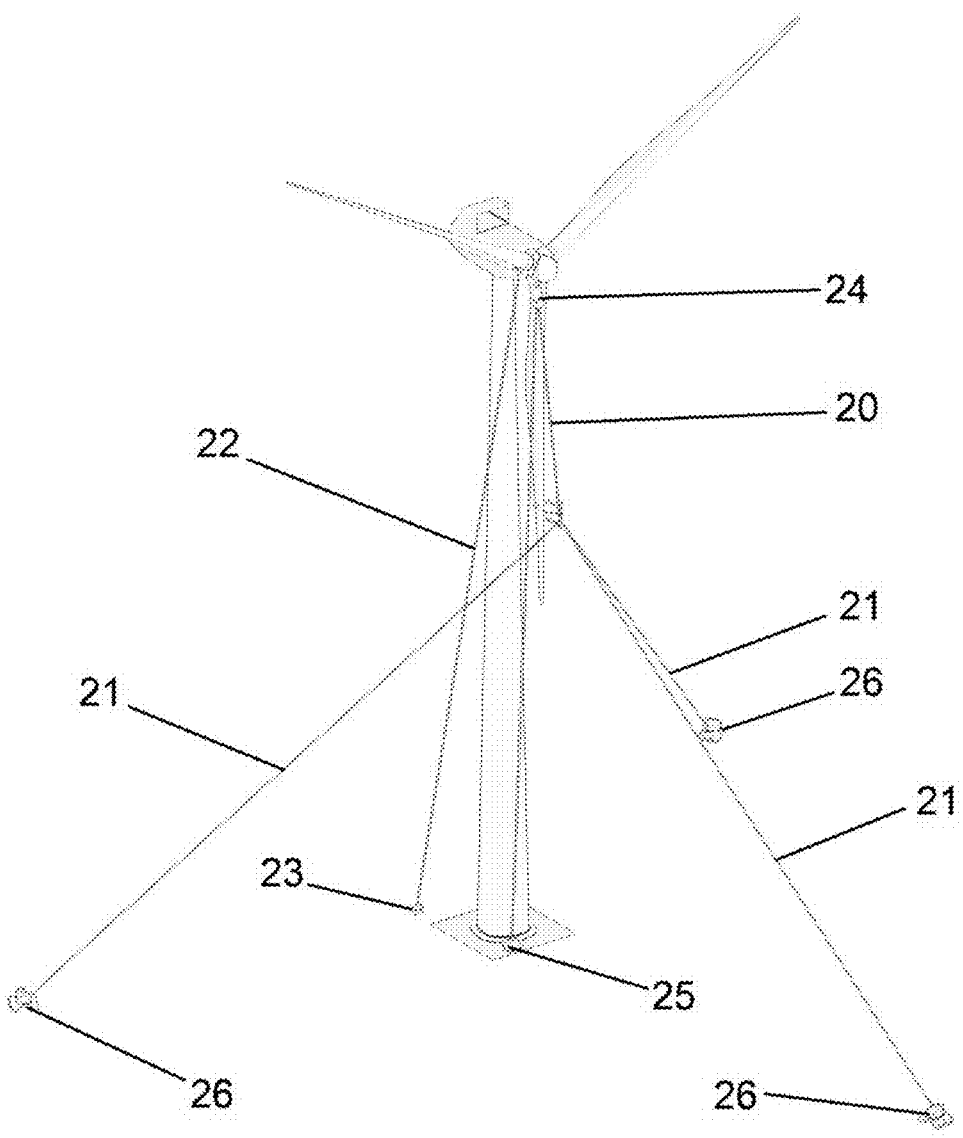
FIG. 3—a schematic view of the arrangement in operation according to one embodiment.

As it is shown in FIG. 3 during maintenance of a wind turbine blade, a carrying rope 20 is attached to the central rod 1 of the arrangement. The balancing ropes 21 are attached to the balancing rods 2.

According to the preferred embodiment the arrangement for wind turbine blade and tower maintenance is used together with a system of ropes, winches and a pulley or a block. The said system comprising: a main rope 22 having ends one and two; a main rope winch or an anchor 23; a pulley or a block 24; the carrying rope 20 having end one and two; a carrying rope winch 25; three balancing ropes 21, each having ends one and two and balancing means 26. The balancing means 26 can be in the form of anchored winches or movable winches. According to one embodiment the balancing means 26 comprise all-terrain vehicles (ATV) with winches installed thereon. End one of the main rope 22 is operably connected to the winch or anchor 23. End two of the main rope 22 is connected to the pulley or block 24, which is hung over the wind turbine blade as shown on FIG. 3. The carrying rope 20 is operably put through the pulley or block 24. End one of the carrying rope 20 is operably connected to the carrying rope winch 25. The end two of the carrying rope 20 is connected to the central rod 1 of the arrangement. Ends one of the balancing ropes 21 are connected to the balancing rods 2. Ends two of the balancing ropes 21 are connected to the balancing means 26. The main rope winch or anchor 23 and/or the carrying rope winch 25 may be placed on a truck trailer.

The system operates as follows. End one of the main rope 22 with the pulley or block 24 is hung over the wind turbine blade. The height of position of the pulley 24 is adjusted as necessary by winding end two of the rope 22. The height of position of the arrangement for wind turbine blade and tower maintenance is adjusted as necessary by winding end one of the carrying rope 20. The stabilization, balance and prevention of rotation of the arrangement is provided by controlling the length and, optionally, the direction of the balancing ropes 21 by winding ends two of the balancing ropes 21 and/or changing location of the balancing means 26.

When work on one blade is finished the arrangement for wind turbine blade and tower maintenance is positioned close to the tower and turbine blades are rotated by about 120 degrees to position the next blade towards ground. When work is finished, the arrangement and the pulley 24, which is directly above it is lowered to the ground, arrangement is disconnected (a dempher is attached instead).

The invention claimed is:

1. Apparatus for wind turbine blade and tower maintenance comprising:

a central hub;

balancing rods connected via hinges to the central hub, the balancing rods extending radially outward and at an angle downward from the central hub, each one of the balancing rods adapted to be coupled to a respective one of a balancing rope or cable to stabilize the apparatus;

a central rod affixed to and extending upward from the central hub, the central rod adapted to be coupled to a carrying rope or cable; and at least one tool arm extending downward from the central hub and adapted to carry one or more tools configured for cleaning, repairing, or maintaining a surface of a wind turbine blade.

2. The apparatus according to claim 1, further comprising:

an arm having a rotatable wheel; and a linear actuator fixed to the arm, the linear actuator adapted to position the apparatus relative to the surface, wherein the rotatable wheel is configured to rest upon the surface.

3. The apparatus according to claim 1, further comprising a rail, a slider, and a motor connected to a lead screw, wherein the rail is fixed to an end of the central rod, with the slider located on the rail and connected to the motor via the lead screw, so that to allow controllable sliding motion of the slider along the rail.

4. The apparatus according to claim 3, wherein the slider further comprises a guide designed to allow the carrying rope or cable to pass through the slider.

5. The apparatus according to claim 1, further comprising a motor that couples the central rod to the central hub, wherein the motor allows controllable rotation of the central rod around its longitudinal axis.

6. The apparatus according to claim 1, wherein the hinges allow at least limited rotation of the balancing rods in a vertical plane.

7. The apparatus according to claim 1, further comprising:
a main rope having first and second ends;
a main rope winch or an anchor;
a pulley or a block;
the carrying rope or cable having first and second ends;
a carrying rope or cable winch;
the balancing ropes or cables each having first and second ends; and
balancing means;
wherein the first end of the main rope is adapted to be operably connected to the main rope winch or anchor; the second end of the main rope is adapted to be connected to the pulley or block;
the carrying rope or cable is adapted to be operably put through the pulley or block; and the first end of the carrying rope or cable is adapted to be operably connected to the carrying rope or cable winch; and
the second end of the carrying rope or cable is adapted to be connected to the central rod; wherein the first ends of the balancing ropes or cables are adapted to be connected to respective ones of the balancing rods; and
the second ends of the balancing ropes or cables are adapted to be connected to respective ones of the balancing means.

8. The apparatus according to claim 7, wherein the balancing means are in the form of anchored or movable winches.

9. The apparatus according to claim 8, wherein the balancing means comprise three all-terrain vehicles with winches installed thereon.

10. The apparatus according to claim 7, wherein the main rope winch or anchor and/or the carrying rope or cable winch are adapted to be placed on a truck trailer.

11. The apparatus according to claim 1, further comprising a tool arm motor rotatably fixed to the central hub or the central rod.

12. The apparatus according to claim 1, wherein the balancing rods extend vertically downward diagonally from the central hub.

13. The apparatus according to claim 1, wherein the apparatus includes three balancing rods.

14. The apparatus according to claim 1, wherein the apparatus includes two balancing rods.

15. Apparatus for wind turbine blade and tower maintenance comprising:
a central hub;
first and second balancing rods coupled via hinges to the central hub, the first and second balancing rods extending radially outward and angled vertically downward from the central hub, each of the first and second balancing rods adapted to be connected to a respective one of a balancing rope or cable;
a central rod upward from the central hub and adapted to be connected to a carrying rope or cable;
at least one tool arm coupled to the central hub and adapted to releasably carry one or more tools configured for surface maintenance; and
a tool arm motor adapted to adjust an angle of the one or more tools relative to a surface to be treated.

16. The apparatus according to claim 15 further comprising:
a rail;
a slider; and
a motor connected to a lead screw,
wherein the rail is fixed to a first end of the central rod, and the slider is located on the rail and connected to the motor via the lead screw to allow controllable sliding motion of the slider along the rail.

17. The apparatus according to claim 16, wherein the slider further comprises a guide designed to allow the carrying rope or cable to pass through the slider.

18. The apparatus according to claim 15 further comprising a motor, a second end of the central rod is rotatably fixed to the central hub via the motor, thereby allowing controllable rotation of the central rod around its longitudinal axis.

19. The apparatus according to claim 15 wherein the hinges are fixed to the central hub and the first and second balancing rods to allow at least limited rotation of the first and second balancing rods in a vertical plane.

20. The apparatus according to claim 15, further comprising a third balancing rod operatively connected to the central hub.

* * * * *